United States Patent [19]

Johnson et al.

[11] Patent Number: 5,126,089
[45] Date of Patent: Jun. 30, 1992

[54] METHOD FOR EASY REMOVAL OF SAND CORES FROM CASTINGS

[75] Inventors: Calvin K. Johnson, Lockport; Bruce E. Wise, Roselle, both of Ill.

[73] Assignee: Acme Resin Corp., Westchester, Ill.

[21] Appl. No.: 744,643

[22] Filed: Aug. 8, 1991

Related U.S. Application Data

[63] Continuation of Ser. No. 488,885, Mar. 5, 1990, abandoned.

[51] Int. Cl.⁵ .................... B22C 9/04; B29C 33/44
[52] U.S. Cl. .................... 264/221; 164/132; 164/526; 264/317; 264/DIG. 44
[58] Field of Search ......... 264/221, 317, DIG. 44; 164/525, 526, 15, 16, 35, 349, 369, 132; 249/61, 63, 64, 183

[56] References Cited

U.S. PATENT DOCUMENTS

| Re. 32,720 | 7/1988 | Lemon et al. | 264/82 |
|---|---|---|---|
| 1,304,200 | 5/1919 | Prescott | 164/132 |
| 2,597,896 | 5/1952 | Oster | 164/132 |
| 3,046,147 | 7/1962 | Hathaway et al. | 106/38.9 |
| 3,563,711 | 2/1971 | Hammond et al. | 164/132 |
| 3,920,460 | 11/1975 | Boston et al. | 106/38.3 |
| 4,331,197 | 5/1982 | Cole | 164/250.1 |
| 4,357,165 | 11/1982 | Helferich et al. | 106/38.3 |
| 4,371,648 | 2/1983 | Gardikes et al. | 164/526 |
| 4,403,046 | 9/1983 | Anderson et al. | 164/526 |
| 4,448,907 | 5/1984 | Schafer | 164/526 |
| 4,526,219 | 7/1985 | Dunnavant et al. | 164/16 |
| 4,540,467 | 9/1985 | Grube et al. | 162/4 |
| 4,588,013 | 5/1986 | Morley | 164/16 |
| 4,615,372 | 10/1986 | Kopac et al. | 164/526 |
| 4,620,586 | 11/1986 | Musschoot | 164/253 |

FOREIGN PATENT DOCUMENTS

| 52-11127 | 1/1977 | Japan. |
| 52-50923 | 4/1977 | Japan. |
| 876033 | 8/1961 | United Kingdom. |

OTHER PUBLICATIONS

*Foundry Management and Technology:* Feb., 1986, pp. 2-6.

*Primary Examiner*—Jay H. Woo
*Assistant Examiner*—Robert B. Davis
*Attorney, Agent, or Firm*—Rockey and Rifkin

[57] ABSTRACT

Sand cores are removed from metal or plastic coatings by exposing the cores to a humid atmosphere for a sufficient time to weaken the binder of the sand cores. The sand is then shaken from the casting. Metal or plastic castings with hollow passages are produced by forming a casting around the sand core bound with a suitable binder followed by exposing the casting and sand core to a humid atmosphere and then shaking the sand from the casting.

14 Claims, No Drawings

METHOD FOR EASY REMOVAL OF SAND CORES FROM CASTINGS

This is a continuation of copending application Ser. No. 07/488,885 filed on Mar. 5, 1990, now abandoned.

FIELD OF THE INVENTION

This invention relates to an improved method for removing sand cores from metal or plastic castings.

BACKGROUND OF THE INVENTION

In the foundry art, cores or molds for making metal castings are normally prepared from a mixture of an aggregate material, such as sand, and a binding amount of a binder or binder system. Typically, after the aggregate material and binder have been mixed, the resulting desired shape or pattern is then cured with the use of catalysts and/or heat to a solid, cured state.

In the usual foundry operation, hot molten metal is poured around the sand core and solidifies with the cavity in the casting taking on the form of the sand core. Because of the high temperature of the metal, the resin system slowly burns out, removing the resin binder from the system. As will be appreciated by those skilled in the art, once the resin binder has been burned out or decomposes, the core, formed essentially of sand, becomes free flowing and can be readily poured out of the casting. If, on the other hand, the binder does not degrade to a sufficient extent, the core, or a portion thereof, remains inside the casting and must be removed by mechanical means.

Iron and steel castings are generally poured at high temperatures where burnout of the resin binder is usually complete. However, metals such as aluminum and brass having lower melting points are poured at lower temperatures where the resin binders frequently do not burn out completely, with the result that cores, or portions thereof, are frequently left in the casting. It is difficult, if not impossible, to shake the sand out of such castings.

In addition, it has not been possible to use resin-bonded sand cores when making cast or molded plastic parts. The temperature needed to burn out the resin binders from such cores is so high that the plastic parts would be destroyed in any attempt to burn out the binders.

The use of sand cores to make complex casting shapes with interior passageways or holes in plastic parts would greatly reduce the cost of manufacturing such parts. In the past, these have been made in two halves and welded or clamped together. This adds to their assembly cost and is impractical for complex shapes. It would therefore be desirable to have a method to break down resin bonded sand cores at relatively low temperatures. Such a method should weaken the cores and permit the sand to shake out at temperatures below the decomposition or melting point of the plastic and preferably below the glass transition temperature of the plastic. Such a method would also be useful with castings of lower-melting metals such as aluminum and brass.

One method to improve the shakeout of sand from metal castings is disclosed in U.S. Pat. No. 2,597,896 to Oster. The casting containing the sand core is exposed to steam under high pressure and then the pressure is suddenly released. Water within the core tends to flash instantaneously to steam with a sharp explosion that tends to disintegrate the core material and to discharge it forcibly from the casting.

U.S. Pat. No. 4,620,586 to Musschoot discloses placing a mold flask containing the sand and hot metal into a vacuum chamber where the pressure is reduced to a very low value. This reduction of pressure causes the moisture in the sand to flash into vapor. It is said that this process causes the sand to fall away from the casting. The sand molds contemplated include a binder material; however, the specific binder is not disclosed.

U.S. Pat. No. 3,563,711 to Hammond, et al. discloses a process for removing siliceous cores from metal castings. The castings containing the cores are heated with a concentrated alkaline solution under pressure and then the vapors are released from the vessel to reduce the pressure and induce boiling of the solution. The pressurization and release steps are repeated until the core is completely removed.

U.S. Pat. No. 4,540,467 to Grube, et al. discloses a method and apparatus for fragmenting municipal waste material which is said to be applicable also for the removal of core material from metal castings. The material is heated under pressure and then the pressure is released suddenly to cause water in the material to flash to steam. The resulting sudden expansion within the material causes it to fragment. It is said that bases such as saturated sodium hydroxide solution could be used to soften compacted sands before they are subjected to this treatment.

U.S. Pat. No. 1,304,200 discloses an apparatus which projects a water jet into a rolled metal bar to remove the sand core from the bar.

U.S. Pat. No. 3,046,147 to Hathaway, et al. discloses a water soluble core binder prepared from borax and phosphate which is said to be useful for making aluminum and plastic castings. They recognize the problems associated with using conventional binders for sand cores when making plastic castings Japanese patent publications 52-11127 and 52-50923 disclose cores for precision metal castings. The first uses a high temperature sintered siliceous core which is removed by dissolving in alkali. The second uses a core binder containing calcium chloride, bentonite and starch that gives a core which is said to be readily collapsible in water.

British Patent No. 876,033, published Aug. 30, 1961, discloses that silica containing products bound with resins lose some of their flexural or compressive strength when exposed to moisture. Silane compounds were added to the resins to improve the moisture resistance of materials bound with the resins.

We have now discovered a method for removing sand cores from castings which have been made under conditions that do not cause burnout of the resin binder. This method is particularly applicable to removing sand cores from cast or molded plastic parts. Such parts are steadily replacing metal parts in automobile engines and similar applications. It is also useful for removing sand cores from other castings such as aluminum and brass which are prepared at temperatures that do not thermally degrade the resin core binders.

SUMMARY OF THE INVENTION

In accordance with this invention, there is provided a method for producing a metal or plastic casting with a hollow passage which comprises forming a bonded sand core having the shape of the hollow passage; forming a metal or plastic casting around the bonded sand core;

exposing the casting and sand core to an atmosphere having a relative humidity of from about 80% to about 100%; maintaining the casting and sand core in said atmosphere for a sufficient time to weaken the binding of the sand core; and removing the sand from the casting.

Further provided, in accordance with this invention, is a method for removing a bonded sand core from a metal or plastic casting which comprises the steps of exposing the casting and sand core to an atmosphere having a relative humidity of from about 80% to about 100% at a temperature of at least about 40° C.; maintaining the casting and core in this atmosphere for at least about ten minutes; and then removing the sand from the casting by mechanical agitation.

Also provided, in accordance with this invention, is a method for removing a bonded sand core from a metal or plastic casting which comprises the steps of exposing the casting and sand core to an atmosphere having a relative humidity of from about 80% to about 100% at a temperature of at least about 40° C.; maintaining the casting and core in this atmosphere for at least about ten minutes; and then flushing the sand from the casting with a jet of water or steam.

DETAILED DESCRIPTION OF THE INVENTION

In the practice of this invention, a sand core is made using conventional techniques as employed by the foundry industry. Typically, such cores are prepared from a mixture of sand and a binding amount of a binder or binder system. Generally, the binder is used at a rate of from about 0.6% to about 8% by weight of the sand. After the sand and binder have been mixed, the resulting mixture is rammed, blown or otherwise formed to the desired shape or pattern and then cured with the use of catalysts and/or heat to a solid, cured state.

In this respect, there have been developed in the foundry industry, a variety of different processes for forming cores. The particular process employed depends upon the binder or binder system being utilized. For example, many liquid binder systems require that hardening be accomplished in a holding pattern or a core box while subjected to heat. Such a process typically uses a phenolic or furan hot box resin or a furan warm box resin.

On the other hand, some binder systems such as, for example, the phenolic urethane cold box resin binders, are cured by passing an amine gas through the resin coated sand at room temperature. Other cold box systems employ silicate binders cured with $CO_2$, epoxy and furan binders cured with $SO_2$ and alkacured line phenolic resins cured with esters.

Still other types of binder systems do not require gassing or heating in order to bring about curing or hardening. Such systems are known as "no-bake" binders. Typical "no-bake" binder systems are the phenolic urethane no-bake resins, the furan no-bake resins and the phenolic no-bake resins, alkaline phenolic ester-cured resins and silicate no-bake binders.

Sand cores bound with any of the foregoing resin systems may be used in the practice of this invention. However, it is particularly suitable for use with sand cores prepared by cold box processes, such as those using the phenolic urethane resins.

Any of the sands commonly used to make foundry cores and molds may be used in the practice of this invention. These include silica sands, lake sands, bank sands, zircon sands, chromite sand, olivine sand and the like. Also, mixtures of these may be used.

It is often the practice in the foundry art to include a variety of additives to the binders used to bond the sands. These include release agents, bench life extenders, clays, iron oxide, silanes and the like. They may be used with the binder in the practice of the present process provided, however, that such agents are not ones that impart so much humidity resistance to the sand cores that the cores are not weakened by exposure to the humid atmosphere employed herein.

The sand cores used in the practice of this invention may be coated with commonly used refractory coating systems such as silica in a solvent to impart a finished surface to the core.

The metal or plastic casting is formed around the bonded sand core using any of the common metal casting or plastic casting or molding techniques. Examples of such processes include placing a core in a green sand mold and pouring molten metal into the mold, or placing the sand core into a permanent mold and pouring the molten metal into it. The sand core may also be placed in a mold and then plastic injection molded or cast around it.

In the practice of the present invention, once the plastic or metal has solidified around the sand core, the casting and sand core are exposed to a humid atmosphere having a relative humidity of from about 80% to about 100%. It is preferable that the temperature of the sand core be at least about 40° C. and, more preferably, that the temperature of the sand core be from about 75° C. to about 110° C.

The casting and sand core are maintained in the humid atmosphere for a sufficient time to weaken the binding of the sand core. If the temperature of the sand core is at least about 40° C., the bonded sand core may become sufficiently weak in about ten minutes. However, exposure to the humid atmosphere may be continued for longer times and exposure periods of up to 120 minutes or more may be useful in certain applications.

This process is readily adapted to a continuous operation. For example, the casting containing the sand core may be placed on a conveyor which passes through a humidity chamber held at the desired temperature and humidity. The size of the chamber and rate of movement of the conveyor are adjusted to give the desired residence time in the chamber.

After the sand core has been sufficiently weakened by exposure to the humid atmosphere, the sand is removed from the casting. Sand may be removed by mechanical agitation as is commonly done with sand cores from which the resin has been burned out by contact with a molten, iron or steel casting at high temperatures. This is accomplished by means of shakers or knock-out devices. Alternatively, the sand may be removed from the casting by means of a jet of water or steam.

With certain binders, the rate at which the bonded sand core is weakened by exposure to water vapor may be accelerated by pretreatment of the sand core. This pretreatment involves immersing the sand core in a dilute alkaline solution or water for from one to ten minutes, drawing the alkaline solution or water through the core, or blowing steam through the core. The alkaline treatment is particularly suitable for castings which are not affected by alkali such as certain plastic castings. Useful dilute alkaline solutions are one percent aqueous solutions of sodium hydroxide, potassium hydroxide or sodium carbonate.

The following specific examples illustrate the present invention. They are not intended to limit the invention in any way. Unless otherwise indicated, all parts and percentages are by weight.

EXAMPLE I

Sand cores, bonded with 1.25 percent by weight of a commercial urethane cold box resin binder, were prepared by the following procedure: Wedron 730 silica sand, 100 parts, was mixed with 0.625 parts by weight of Acme Flow 2035 (a commercial phenolic resin available from the Acme Resin Corporation. Westchester, Ill.) and 0.625 parts by weight of Acme Flow 2055 (a commercial polyisocyanate solution available from the Acme Resin Corporation). The mix was blown into a Redford CBT-1 core blower. Cores were blown at 50 psi air pressure and gassed for 2 seconds with 12% dimethylethylamine in $CO_2$ at 30 psi and then for 6.5 seconds with purge air at 30 psi. Tensile strengths were then measured using Detroit Testing Machine Company Model CST Tensile Tester. Additional cured cores were suspended above water in a loosely-covered container and heated in an oven at 93° C. or 177° C. for various times before the tensile strengths of the cores were determined. Parallel tests using cores containing an inserted temperature probe showed that the cores in the 93° oven had temperatures of 56° C., 71° C., 78° C. and 78° C. after exposure for times of 15, 30, 45 and 60 minutes, respectively. Cores in the 177° oven had temperatures of 91° C., 92° C., 91° C. and 106° C. for times of 15, 30, 45 and 60 minutes, respectively. The tests were repeated with sand cores bonded with one percent by weight of the urethane resin binder using equal amounts of each component. The results are reported in Table I, where all tensile tests are the average of three determinations. These results demonstrate that the process of this invention reduces the strength of the cores sufficiently so that they can be easily broken by shaking or other mechanical means.

TABLE I

| | TENSILE STRENGTHS OF RESIN BONDED SAND CORES | | | | | |
|---|---|---|---|---|---|---|
| RESIN BIN- | 1 HOUR TEN- | OVEN | TENSILE (PSI) AFTER HEATING FOR[2] | | | |
| DER (%) | SILE[1] (PSI) | TEMP. (°C.) | 15 MIN | 30 MIN | 45 MIN | 60 MIN |
| 1.25 | 256 | 93 | 41 | 33 | 37 | 35 |
| 1.25 | 223 | 177 | 27 | 17 | 17 | 14 |
| 1.0 | 202 | 93 | 25 | 21 | 18 | 13 |
| 1.0 | 211 | 177 | 14 | 11 | 12 | 11 |

[1]Tensile strength in pounds per square inch (PSI) one hour after cores made and before exposure to moisture
[2]Cores were placed in a loosely covered container which contained water, the cores were above the water and not submerged. The containers with the cores were placed in the oven for varying amounts of time. The cores were broken hot.

EXAMPLE II

The general procedure of Example I was followed, except that the resin bonded sand cores were soaked for one minute in one percent aqueous sodium hydroxide solution before they are exposed to the humid atmosphere. The results are given in Table II. A comparison of the results given in Tables I and II shows that exposures of the resin bonded sand cores to the dilute alkaline solution before they were exposed to a humid atmosphere caused their tensile strengths to be lowered even further.

In a parallel set of experiments in which the cores were first soaked in water rather than dilute sodium hydroxide solution, no corresponding lowering of the tensile strengths were observed.

TABLE II

| | TENSILE STRENGTHS OF RESIN COATED SAND CORES | | | | | |
|---|---|---|---|---|---|---|
| RESIN BIN- | 1 HOUR TEN- | OVEN | TENSILE (PSI) AFTER HEATING FOR[2] | | | |
| DER (%) | SILE[1] (PSI) | TEMP. (°C.) | 15 MIN | 30 MIN | 45 MIN | 60 MIN |
| 1.25 | 249 | 93 | 42 | 26 | 21 | 18 |
| 1.25 | 232 | 177 | 12 | 9 | 10 | 9 |
| 1.0 | 196 | 93 | 27 | 17 | 17 | 13 |
| 1.0 | 163 | 177 | 9 | 7 | 6 | 8 |

[1]Tensile strength in pounds per square inch (PSI) one hour after cores made and before exposure to moisture
[2]Cores were soaked in one percent sodium hydroxide for one minute then placed in a loosely-covered container which contained water; the cores were placed above the water. The containers with the cores were placed in the oven for varying amounts of time. The cores were broken hot.

EXAMPLE III

Sand cores were prepared using 0.8% based on sand weight of a commercial phenolic no-bake resin, Superset 324 and a sulfonic acid catalyst, Superset 220WAE, at a 0.24% level based on sand weight. Both resin and catalyst are available from the Acme Resin Corporation. Tensile strength was measured after 24 hours. Additionally, some cores were held for 24 hours before they were exposed to a humid atmosphere in an oven at 93° C. for various times before their tensile strengths were determined, as was done for the cores prepared in Example I. The experiment was repeated using a resin containing one-fourth the amount of silane present in the commercial product. Similar tests were performed with cores bound with the furan no-bake resin, Superset 3R, cured with a sulfonic acid catalyst, Superset 94A. The test was repeated using sand cores prepared with the furan no-bake resin which contained no silane. (All Superset products are available from the Acme Resin Corporation). The results given in Table III show that the process of this invention is suitable for use with sand cores bonded with phenolic and furan no-bake resins and is particularly suitable when these resins contain a reduced amount of silane additive.

TABLE III

| | TENSILE STRENGTHS OF RESIN COATED SAND CORES | | | | |
|---|---|---|---|---|---|
| | TENSILE[1] BEFORE | TENSILE (PSI) AFTER HEATING FOR[2] | | | |
| BINDER | HEATING (PSI) | 15 MIN. | 30 MIN. | 45 MIN. | 60 MIN. |
| Phenolic (0.45% Silane) | 328 | 148 | 145 | 124 | 123 |
| Phenolic (0.12% Silane) | 120 | 99 | 63 | 45 | 52 |
| Furan (0.16% Silane) | 235 | 101 | 127 | 124 | 116 |
| Furan (No Silane) | 194 | 21 | 7 | 7 | 7 |

[1]Tensile in pounds per square inch (PSI) 24 hours after the cores were made and before exposure to moisture.
[2]Cores were placed in a loosely covered container which contained water; the cores were placed above the water. Containers with the cores were left in a 93° C. oven for varying times before the cores were broken hot.

EXAMPLE IV

Tensile strength of cores bound with the furan no-bake resins as done in Example III were measured before and after storage for 24 hours in a 90% humidity chamber at 24° C. The cores bound with commercial resin containing 0.16% silane showed an average tensile strength of 313 psi before and 147 psi after exposure to 90% relative humidity. Cores bound with the same resin, except that it contained no silane, showed an average tensile strength of 237 psi before and 39 psi after exposure to 90% relative humidity.

EXAMPLE V

Sand cores bound with various other binders were tested in a similar manner to those in the previous examples. Sand cores bound with 1.75% by weight of sand of a phenolic hot box resin (Acme 745PL) and 0.35% by weight of sand of catalyst (Acme 82C) were prepared by heating for 30 seconds at 225° C. After one hour, tensiles of samples were measured. Other samples were suspended above water in an oven at 93° C. for varying times before the tensiles of those samples were measured. In additional tests, sand containing 3% by weight of sodium silicate binder (Coset 2, available from the Acme Resin Corporation) was formed into test cores and cured by passing carbon dioxide through the mixture for 20 seconds. After 24 hours, the tensile strengths of the sand cores were measured with and without subjecting to the humidity treatment in the 93° C. oven. In parallel tests, sand was bound with a commercial epoxy resin which contained 1% by weight of the resin CL 3312 and 0.5% of a peroxide catalyst CL 3313, both available from CL Industries, Danville, Ill. The binder was cured by passing sulfur dioxide through the mixture for 30 seconds. The tensile strengths of the cores and the exposure of the cores to moisture were performed after the cores had set for 24 hours. Additional tests were made with sand cores containing 1.5% by weight of the sand of an alkaline phenolic resole resin, Betaset 9513 (available from the Acme Resin Corporation). The resin was cured by gassing the core for ten seconds with methyl formate vapors. Tensile strengths of the cores and exposure of the cores to moisture were performed after the cores and had set for 24 hours. The results given in Table IV demonstrate that the process of the present invention is suitable for use with sand cores bonded with these additional types of binders.

TABLE V

| | TENSILE STRENGTHS OF RESIN COATED SAND CORES | | | | |
|---|---|---|---|---|---|
| | | TENSILE (PSI) AFTER HEATING FOR[1] | | | |
| BINDER | TENSILE (PSI) | 15 MIN. | 30 MIN. | 45 MIN. | 60 MIN. |
| Phenolic Hot Box | 487[2] | 23 | 11 | 10 | 22 |
| Epoxy-SO$_2$ | 72[3] | 17 | 16 | 14 | 14 |
| Silicate-CO$_2$ | 136[3] | 12 | 18 | 9 | 8 |
| Alkaline Phenolic Ester Cured | 147[3] | 58 | 50 | 54 | 58 |

[1]Tensile in pounds per square inch (PSI) after exposure to moisture for the given times in a 93° C. oven
[2]Tensile in pounds per square inch (PSI) one hour after the cores were made and before exposure to moisture
[3]Tensile 24 hours after cores were made and before exposure to moisture

EXAMPLE VI

This example uses knock-out equipment Model HP87 manufactured by the Herschal Products, Inc. Elyria, Ohio. The equipment was used to remove cores from a plastic part which had been injection molded around the core.

The sand cores were prepared as in Example I using 100 parts of sand mixed with 0.5 parts by weight of phenolic resin Acme Flow 2010A and 0.5 parts of a polyisocyanate solution Acme Flow 2041, both available from the Acme Resin Corporation. The cores were cured using dimethylethylamine. A plastic was injection molded around the core. Each plastic piece was 12.7 cm × 3.8 cm. A plastic piece with the sand core inside was then vibrated using the knock-out equipment with the air pressure on the clamp and vibration set at 40 psi. When a plastic piece with the core inside was vibrated for one minute, the core remained intact. However, when a plastic piece containing the core was first placed in a humidity cabinet for one hour at 93° C. and 98% relative humidity, the knock-out equipment caused the core to break apart and completely come out of the plastic piece in 34 seconds. When the experiment was repeated with a plastic piece placed in a humidity cabinet set at 93° C. and 80% relative humidity for one hour, the vibrating equipment caused complete removal of the core within 16 seconds. A comparable experiment was run using Wedron 530 sand in place of the Wedron 730 sand. In this case, the plastic piece containing the core which was not exposed in the humidity cabinet failed to release the core when it was vibrated in the knock-out equipment for one minute. However, when a plastic piece containing the same core was first placed in a humidity cabinet at 93° C. and 98% relative humidity for one hour, the core was completely removed from the piece after 42 seconds of vibration. These experiments clearly demonstrate that the process of this invention is useful for removing sand cores from plastic parts.

EXAMPLE VII

Sand cores were prepared as in Example I using 100 parts of sand mixed with 0.625 parts by weight of a phenolic resin, Acme Flow 2010A (without the normal silane additive) and 0.625 parts of a polyisocyanate solution, Acme Flow 2050, both available from the Acme Resin Corporation. The cores were cured using dimethylethylamine. A plastic was injected molded around the cores. The plastic piece is about 36 cm long and 14 cm wide at its widest point. The plastic piece with the sand core inside was vibrated using the knock-out machine of Example VI with the air pressure on the clamp and vibration set at 40 psi.

When a plastic piece with the core inside was vibrated for 1½ minutes, the core remained intact. A second plastic piece containing the core was first pretreated by drawing water through the core and then was placed in a loosely covered container which also contained water. The core was above the water. The container was then placed in a 204° C. oven for one hour. After being vibrated by the knockout machine for 38 seconds, the core began to break apart. After 90 seconds, approximately 75% of the core was removed from the plastic piece. A third plastic piece containing a core was first pretreated by drawing 1% sodium hydroxide solution through the core, and then placed in a loosely covered container which also contained water. The core was above the water. The container was then placed in a 204° C. oven for one hour. The plastic piece with the core was then removed from the oven. After being vibrated by the knockout machine for 14 seconds, the core began to break apart. After 50 seconds, the core was completely removed from the plastic piece.

Thus, it is apparent that there has been provided, in accordance with the invention, a method to improve the shakeout of sand cores which have not been exposed to high temperatures that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to include all such alternatives, modifications and variations as set forth within the spirit and scope of the appended claims.

What is claimed is:

1. A method for producing a metal or plastic casting with a hollow passage which comprises:
    forming a bonded sand core having the shape of the hollow passage wherein the sand core is bonded with a binder selected from the group consisting of phenolic urethane no-bake resins, furan warm box resins, furan no-bake resins, phenolic no-bake resins, phenolic urethane cold box resins, phenolic hot box resins, furan hot box resins, epoxy-$SO_2$ binders, furan-$SO_2$ binders and alkaline phenolic resins cured with esters;
    forming a metal or plastic casting around the bonded sand core;
    drawing a dilute alkaline solution or water through the sand core;
    then opposing the casting and sand core to an atmosphere having a relative humidity of from about 80% to about 100% at a temperature of at least about 40° C.
    maintaining the casting and sand core in said atmosphere for a sufficient time to weaken the binding of the sand core; and
    removing the sand core from the casting.

2. The method of claim 1, wherein the casting and sand core are exposed to the atmosphere having a relative humidity of from about 80% to about 100% for from about 10 to about 120 minutes.

3. The method of claim 1, wherein the temperature of the sand core is from about 75° C. to about 110° C.

4. The method of claim 1, wherein the sand is removed from the casting by mechanical agitation.

5. The method of claim 1, wherein the sand is removed from the casting by means of a jet of water or steam.

6. The method of claim 1, wherein the dilute alkaline solution is a one percent by weight aqueous solution of sodium hydroxide, potassium hydroxide or sodium carbonate.

7. A method for removing a bonded sand core, bonded with a binder selected from the group consisting of phenolic urethane no-bake resins, furan no-bake resins, phenolic no-bake resins, phenolic urethane cold box resins, furan warm box resins, phenolic hot box resins, furan hot box resins, epoxy-$SO_2$ binders, furan-$SO_2$ binders and alkaline phenolic resins cured with esters, from a metal or plastic casting which comprises the steps of:
    drawing a dilute alkaline solution or water through the sand core;
    then exposing the casting and sand core to an atmosphere having a relative humidity of from about 80% to about 100% and at a temperature of at least about 40° C.;
    maintaining the casting and core in this atmosphere for at least about 10 minutes; and then
    removing the sand from the casting by mechanical agitation.

8. The method of claim 7, wherein the casting and sand core are exposed to the atmosphere having a relative humidity of from about 80% to about 100% for from about 10 to about 120 minutes.

9. The method of claim 7, wherein the temperature of the sand core is from about 75° C. to about 110° C.

10. The method of claim 7, wherein the dilute alkaline solution is a one percent by weight aqueous solution of sodium hydroxide, potassium hydroxide or sodium carbonate.

11. A method for removing a bonded sand core, bonded with a binder selected from the group consisting of phenolic urethane no-bake resins, furan no-bake resins, phenolic no-bake resins, phenolic urethane cold box resins, furan warm box resins, phenolic hot box resins, furan hot box resins, epoxy-$SO_2$ binders, furan-$SO_2$ binders and alkaline phenolic resins cured with esters, from a metal or plastic casting which comprises the steps of:
    drawing a dilute alkaline solution or water through the sand core;
    then exposing the casting and sand core to an atmosphere having a relative humidity from about 80% to about 100% at a temperature of at least about 40° C.;
    maintaining the casting and core in this atmosphere for at least about ten minutes;
    an then flushing the sand from the casting with a jet of water or steam.

12. The method of claim 11, wherein the casting and sand core are exposed to the atmosphere having a relative humidity of from about 80% to about 100% for from about 10 to about 120 minutes.

13. The method of claim 11, wherein the temperature of the sand core is from about 75° C. to about 110° C.

14. The method of claim 11, wherein the dilute alkaline solution is a one percent by weight aqueous solution of sodium hydroxide, potassium hydroxide or sodium carbonate.

* * * * *